(12) United States Patent
Schwärzler et al.

(10) Patent No.: US 7,632,189 B2
(45) Date of Patent: Dec. 15, 2009

(54) COUNTER TRACK JOINT FOR LARGE ARTICULATION ANGLES

(75) Inventors: Peter Schwärzler, Glattbach (DE); Heiko Harnischfeger, Freiensteinau-Weidenau (DE)

(73) Assignee: GKN Driveline Deutschland GmbH, Lohmar (DE)

( * ) Notice: Subject to any disclaimer, the term of this patent is extended or adjusted under 35 U.S.C. 154(b) by 402 days.

(21) Appl. No.: 10/568,896

(22) PCT Filed: Jun. 5, 2004

(86) PCT No.: PCT/EP2004/006088
§ 371 (c)(1),
(2), (4) Date: Aug. 29, 2006

(87) PCT Pub. No.: WO2005/028895
PCT Pub. Date: Mar. 31, 2005

(65) Prior Publication Data
US 2006/0281565 A1      Dec. 14, 2006

(30) Foreign Application Priority Data
Aug. 22, 2003  (DE) ............................... 103 38 719
Apr. 19, 2004  (DE) ....................... 10 2004 018 777

(51) Int. Cl.
*F16D 3/224*      (2006.01)
(52) U.S. Cl. ...................................... 464/145; 464/906
(58) Field of Classification Search ............... 464/140, 464/145, 906
See application file for complete search history.

(56) References Cited

U.S. PATENT DOCUMENTS 4,950,206 A      8/1990    Jacob et al.
(Continued)

FOREIGN PATENT DOCUMENTS

DE        3739867        6/1989
(Continued)

OTHER PUBLICATIONS

Abstract not available for DE 19905451, therefore submitting the abstract of corresponding document GB 2346671 (1 page).
Abstract not available for DE 3739867, therefore submitting the abstract of corresponding document FR 2623579 (1 page).
(Continued)

*Primary Examiner*—Greg Binda
(74) *Attorney, Agent, or Firm*—Rader, Fishman & Grauer PLLC

(57) ABSTRACT

A constant velocity counter track joint having an outer joint part with outer ball tracks having first tracks opening toward the aperture end and second tracks opening toward the attaching end. The center line of the second tracks, departs, radially inwardly, a first reference radius centered in the point of intersection of a perpendicular line on the tangent at the center line of the ball track and the longitudinal axis. In the inner joint part, the center line of the ball tracks departs, radially inwardly, a second reference radius centered in the point of intersection of a perpendicular line on the tangent at the center line of the ball track and the longitudinal axis. In the outer joint part, the center line of the ball tracks towards the aperture end, moves radially outwardly beyond said first reference radius. In the inner joint part, the center line of the ball tracks towards the attaching end, moves radially outwardly beyond said second reference radius.

13 Claims, 8 Drawing Sheets

U.S. PATENT DOCUMENTS

| | | | |
|---|---|---|---|
| 5,643,091 | A | 7/1997 | Kozlowski |
| 5,685,777 | A | 11/1997 | Schwarzler et al. |
| 7,025,683 | B2 * | 4/2006 | Schwarzler ................ 464/145 |
| 2001/0006910 | A1 | 7/2001 | Krude et al. |

FOREIGN PATENT DOCUMENTS

| | | |
|---|---|---|
| DE | 3939531 | 6/1991 |
| DE | 19831014 | 2/2000 |
| DE | 19905451 | 9/2000 |
| DE | 10033491 | 1/2002 |
| DE | 10060220 | 6/2002 |
| DE | 10337612 | 6/2004 |
| DE | 10337918 | 3/2005 |
| GB | 1232898 | 5/1971 |
| GB | 1243550 | 8/1971 |
| JP | 07317791 | 12/1995 |
| JP | 11303882 | 11/1999 |
| WO | 03029674 | 4/2003 |

OTHER PUBLICATIONS

Abstract not available for DE 3939531, therefore submitting the abstract of corresponding document FR 2655103 (1 page).
Abstract not available for DE 19831014, therefore submitting the abstract of corresponding document FR 2781023 (1 page).
English abstract of DE 10033491 (1 page).
English abstract of DE 10337918 (1 page).
English abstract of DE 10337612 (1 page).
English abstract of DE 10060220 (1 page).
English abstract of WO 03029674 (1 page).
English abstract of GB 1243550 (1 page).
English abstract of JP 11303882 (1 page).
English abstract of GB 1232898 (1 page).
English Language Abstract of JP 07317791.

* cited by examiner

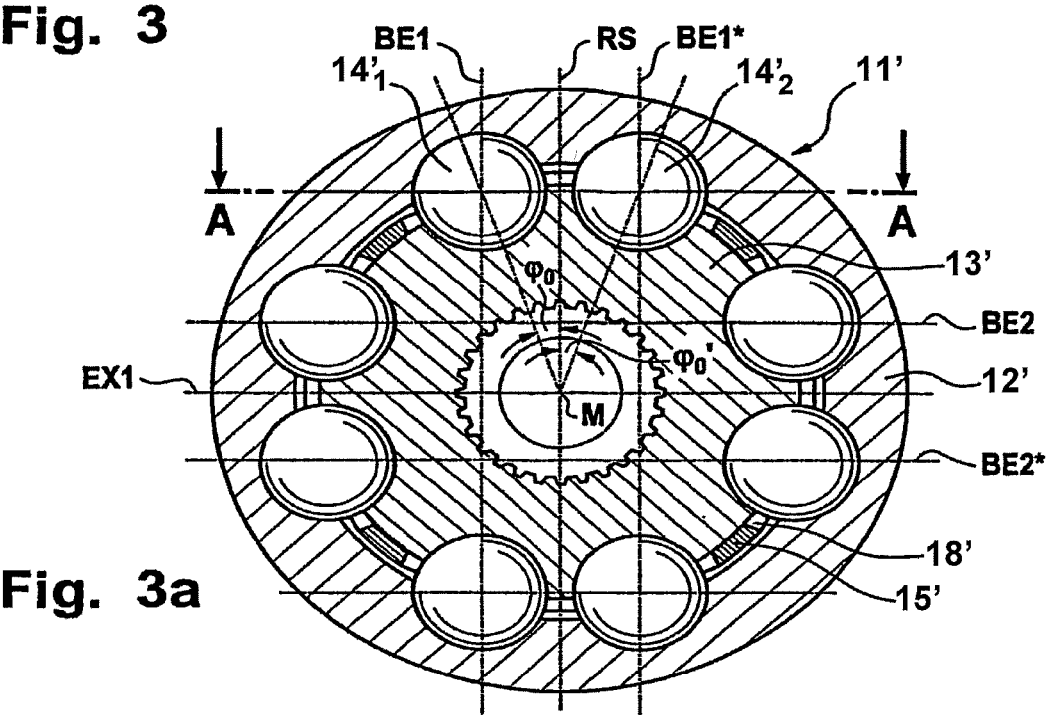
Fig. 3
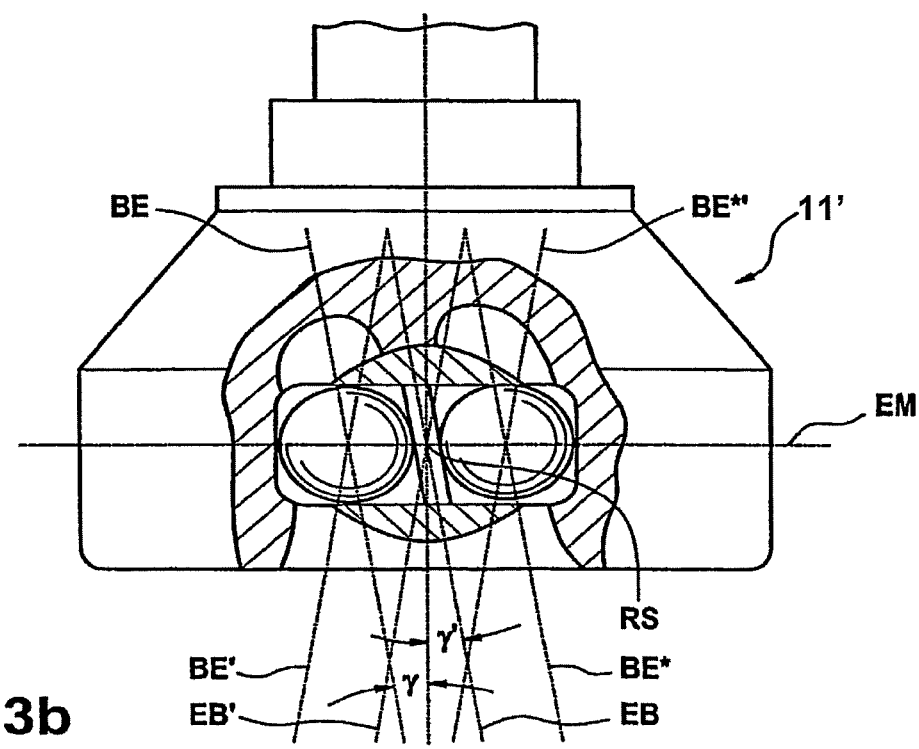
Fig. 3a
Fig. 3b

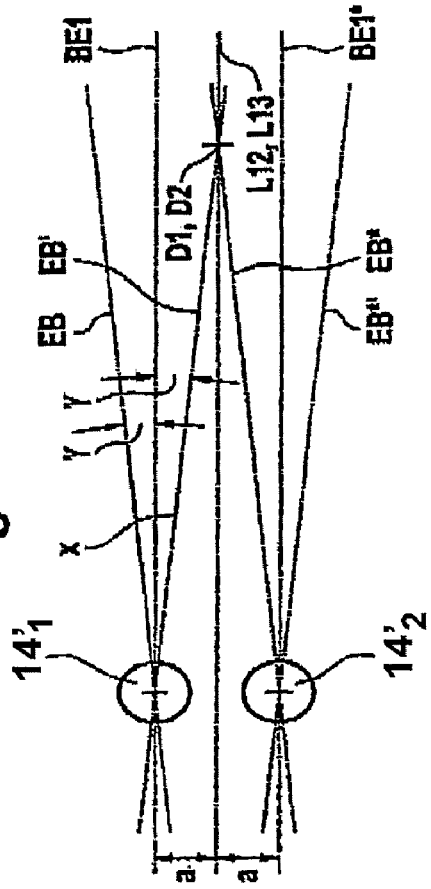
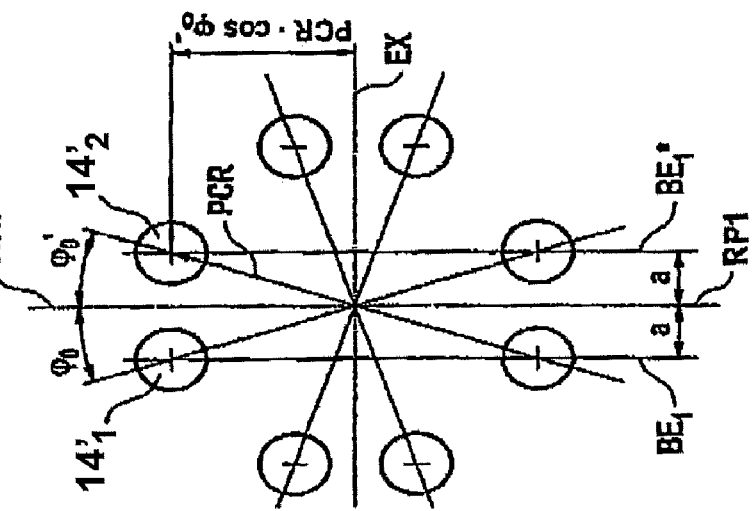
Fig. 4a
Fig. 4b
Fig. 4c

COUNTER TRACK JOINT FOR LARGE ARTICULATION ANGLES

TECHNICAL FIELD

The invention relates to a constant velocity joint in the form of a counter track joint with the following characteristics:

an outer joint part which comprises a longitudinal axis L12 and an attaching end and an aperture end arranged so as to be axially opposite one another, and which is provided with outer ball tracks;

an inner joint part which comprises a longitudinal axis L13 and attaching means for a shaft pointing towards the aperture end of the outer joint part, and which is provided with inner ball tracks;

the outer ball tracks and the inner ball tracks form pairs of tracks with one another, the pairs of tracks each accommodate a torque transmitting ball;

an annular ball cage is positioned between the outer joint part and the inner joint part and comprises circumferentially distributed cage windows which each accommodate at least one of the torque transmitting balls, the centers of the balls are held by the cage in a joint center plane EM and, upon articulation of the joint, are guided onto the angle-bisecting plane between the longitudinal axes L12, L13, for a first part of the pairs of tracks, the opening angle $\alpha_1$ between the tangents $T22_1'$, $T23_1'$ at track base lines extending parallel to the tangents $T22_1$, $T23_1$ at the center lines $M22_1$, $M23_1$ of the ball tracks in the joint center plane EM when the joint is in the aligned condition with coinciding longitudinal axes L12, L13, opens from the attaching end to the aperture end. For a second part of the pairs of tracks, the opening angle $\alpha_2$ between the tangents $T22_2'$, $T23_2'$ at track base lines extending parallel to the tangents $T22_2$, $T23_2$ at the center lines of the ball tracks in the joint center plane when the joint is in the aligned condition with coinciding longitudinal axes L12, L13 opens from the aperture end to the attaching end. With reference to the joint center plane EM, the center lines of pairs of tracks are substantially mirror-image like relative to one another.

BACKGROUND

Prior art counter track joints comprise an even number of pairs of tracks. The first half of said pairs of tracks opens towards the aperture end of the outer joint part. The other half of said pairs of tracks opens towards the attaching end of the outer joint part. The pairs of tracks of the first type and second type are arranged so as to alternate if viewed in the circumferential direction. The tracks are arranged on meridian planes R which, in the circumferential direction, comprise uniform pitch angles of 360°/n, with n being the number of pairs of tracks, e.g. 6, 8, 10.

The alternating pairs of tracks are curved in such a way that, in the joint center plane EM, they comprise a tangent angle $\alpha_1$, $\alpha_2$ at the track base lines, which angles are identical in size, but differ in respect of orientation, and the track extensions of the alternating pairs of tracks are mirrored with reference to the joint center plane.

Prior art counter track joints permit only a relatively small articulation angle of 35°, which is due to the pairs of tracks opening towards the attaching end of the outer joint part and closing towards the aperture end and having to be relatively short towards the aperture end to allow the cage to be mounted in the outer joint part.

U.S. Publication No. 2004/0116192 proposes counter track joints wherein the second pairs of tracks are provided with different track shapes which also include track center lines extending in an S-shaped way and having a turning point in the outer joint part and in the inner joint part. The track center lines are defined as being the path of the centers of the balls in the ball tracks.

SUMMARY OF THE INVENTION

The present invention provides fixed joints of the above-described type with increased articulation angles.

A first solution provides a constant velocity joint in the form of a counter track joint having:

an outer joint part which comprises a longitudinal axis L12 and an attaching end and an aperture end arranged so as to be axially opposite one another, and which is provided with outer ball tracks; and an inner joint part which comprises a longitudinal axis L13 and an attachment for a shaft pointing towards the aperture end of the outer joint part, and which is provided with inner ball tracks.

The outer ball tracks and the inner ball tracks form pairs of tracks with one another, the pairs of tracks each accommodate a torque transmitting ball.

An annular ball cage is positioned between the outer joint part and the inner joint part and comprises circumferentially distributed cage windows which each accommodate at least one of the torque transmitting balls.

The centers of the balls are held by the cage in a joint center plane and, upon articulation of the joint, are guided onto the angle-bisecting plane between the longitudinal axes. The center lines M22, M23 of the ball tracks of pairs of tracks are positioned in radial planes R through the joint. For a first part of the pairs of tracks, the opening angle $\alpha_1$ between the tangents $T22_1'$, $T23_1'$ at track base lines extending parallel to the tangents $T22_1$, $T23_1$ at the center lines $M22_1$, $M23_1$ of the ball tracks in the joint center plane EM when the joint is in the aligned condition with coinciding longitudinal axes L12, L13 opens from the attaching end to the aperture end.

For a second part of the pairs of tracks, the opening angle $\alpha_2$ between the tangents $T22_2'$, $T23_2'$ at track base lines extending parallel to the tangents $T22_2$, $T23_2$ at the center lines $M22_2$, $M23_2$ of the ball tracks $22_2$, $23_2$ in the joint center plane EM when the joint is in the aligned condition with coinciding longitudinal axes L12, L13 opens from the aperture end to the attaching end. The following applies to the center lines of the second pairs of tracks;

in the outer joint part, the center line $M22_2$ of the ball tracks in the region from the joint center plane EM to the attaching end radially inwardly leaves a reference radius RB whose radius center MB is positioned in the point of intersection of a perpendicular line on the tangent $T22_2'$ at the center line $M22_2$ of the ball track in the joint center plane EM and of the longitudinal axis L12;

in the inner joint part, the center line $M23_2$ of the ball tracks in the region from the joint center plane EM to the aperture end radially inwardly leaves a reference radius RB' whose radius center MB' is positioned in the point of intersection of a perpendicular line on the tangent $T23_2'$ at the centre line $M23_2$ of the ball track in the joint center plane EM and of the longitudinal axis (L13).

In the outer joint part, the center line $M22_2$ of the ball tracks in the region from the joint center plane EM to the aperture end moves radially outwardly beyond said reference radius RB.

In the inner joint part, the center line $M23_2$ of the ball tracks in the region from the joint center plane EM to the attaching end moves radially outwardly beyond said reference radius RB'.

The track shape given here permits the maximum articulation angle to be increased relative to prior art track shapes. The characteristic mentioned first according to which the center lines leave the reference radii inwardly can start directly at the joint center plane or even at a later stage, and it can behave so as to increase progressively. The second characteristic mentioned according to which the center lines move outwardly beyond the reference radius includes a direct outward movement away from the reference radius as well as a later crossing of the reference radius and subsequent outward movement.

According to a further embodiment, the constant velocity joint is provided with the following further characteristics of the second pairs of tracks:

in the outer joint part, the local radius of curvature R1 of the center line $M22_2$ in the joint center plane EM is smaller than the reference radius RB; and in the inner joint part, the local radius of curvature R1' of the center line $M23_2$ in the joint centre plane EM is smaller than the reference radius RB'.

According to another embodiment, the constant velocity joint is provided with the following further characteristics of the second pairs of tracks:

in the outer joint part, the center line $M22_2$ of the ball tracks extends from the joint center plane EM to the attaching end radially outside a reference radius RZ whose radius center is positioned in the joint center M; and in the inner joint part, the center line $M23_2$ of the ball tracks extends from the joint center plane EM to the aperture end radially outside a reference radius RZ' whose radius center is positioned in the joint center M.

A further advantageous embodiment refers to the following further characteristics of the second pairs of tracks:

in the outer joint part, the center line $M22_2$ of the ball tracks extends from the joint center plane EM to the aperture end radially outside a reference radius RB and, in the inner joint part, the center line $M23_2$ of the ball tracks extends from the joint center plane EM to the attaching end radially outside a reference radius RB'.

According to a further embodiment, the following further characteristics are proposed: in the outer joint part, the center line $M22_2$ of the ball tracks extends from the joint center plane EM to the aperture end radially inside a reference radius RZ around the joint center M; and in the inner joint part, the center line $M23_2$ of the ball tacks extends from the joint center plane EM to the attaching end radially inside a reference radius RZ' around the joint center M.

According to a further embodiment, the following further characteristics of the second ball tracks are proposed:

the center lines $M22_2$, $M23_2$ of the outer ball tracks and inner ball tracks each comprise at least two arched portions which are curved in opposite senses and which adjoin one another in a turning point.

The turning points $W22_2$ of the outer ball tracks are positioned at a distance from the center plane EM towards the aperture end.

The turning points $W23_2$ of the inner ball tracks are positioned at a distance from the center plane EM towards the attaching end.

The turning points $W22_2$, $W23_2$ are each positioned below a maximum of the distance of the center lines $M22_2$, $M23_2$ from the longitudinal axes L12, L13. A further embodiment comprises the following characteristics of the second pairs of tracks:

the track center lines $M22_2$ of the outer ball tracks comprise a first arch with the radius R1 whose center M1 is offset by a first axial offset O1a from the center plane EM of the joint towards the attaching end and by a first radial offset O1r from the longitudinal axis L12 outwardly towards the ball track and, in the region adjoining said arch, towards the attaching end. They comprise a second arch with the radius R2 whose center M2 is offset by a second axial offset O2a from the center plane EM of the joint towards the aperture end and offset outwardly from the longitudinal axis L12 by a second radial offset O2r which is greater than the sum of the first radius R1 and the first radial offset O1r.

The track center lines $M23_2$ of the inner ball tracks comprise a first arch with the radius R1' whose center M1' is offset by a first axial offset O1a' from the center plane EM of the joint towards the aperture end and offset outwardly by a first radial offset O1r' from the longitudinal axis L13 to the ball track and, in the region adjoining said arch, towards the aperture end, they comprise a second arch with the radius R2' whose center is offset by a second axial offset O2a' from the centre plane EM of the joint towards the attaching end and offset outwardly from the longitudinal axis L13 by a second radial offset O2r' which is greater than the sum of the first radius R1' and the first radial offset O1r'.

More particularly, the following further characteristics of the second pairs of tracks are proposed:

the radius of curvature of the center lines M22 of the outer ball tracks decreases in the extension from the center plane EM to the attaching end and the radius of curvature of the centre line M23 of the inner ball tracks decreases in the extension from the center plane EM to the aperture end.

More particularly, the following further characteristics of the second pairs of tracks are proposed:

the track center lines $M22_2$ of the outer ball tracks comprise a third arch with the radius of curvature R3 which tangentially, while having the same sense of curvature, adjoins the first arch with the radius of curvature R1 and whose radius of curvature R3 is smaller than the radius of curvature R1, and the track center lines $M23_2$ of the inner ball tracks comprise a third arch with the radius of curvature R3' which tangentially, while having the same sense of curvature, adjoins the first arch with the radius of curvature R1' and whose radius of curvature R3' is smaller than the radius of curvature R1'.

According to a further embodiment, in the second pairs of tracks, along the extension of the center line $M22_2$ of the outer ball tracks, towards the aperture end, the second arch is adjoined by an axis-parallel straight line G3 and, along the extension of the center line of the inner all tracks $M23_2$, towards the attaching end, the second arch is adjoined by an axis-parallel straight line G3'.

According to an alternative embodiment, in the second pairs of tracks, along the extension of the centre line $M22_2$ of the outer ball tracks, towards the aperture end, the second arch is adjoined by a straight line which approaches the longitudinal axis L12 and that, along the extension of the center line M23$_2$ of the inner ball tracks, towards the attaching end, the second arch is adjoined by a straight line which approaches the longitudinal axis L13.

According to a further characteristic in the second pairs of tracks, the center lines M22, M23 of the ball tracks in the joint center plane EM intersect one another at an angle of 4 to 32°, wherein the tangents T22, T23 at the center lines M22, M23 of the ball tracks of all pairs of tracks when the joint is in the aligned condition form identical opening angles α.

Preferably, first pairs of tracks and second pairs of tracks are arranged so as to alternate around the circumference. The radial planes R1 of the first pairs of tracks and the radial planes R2 of the second pairs of tracks, in the circumferential direction, can, more particularly, comprise identical pitch angles. In a special embodiment, the first pairs of tracks and the second pairs of tracks do not extend symmetrically relative to the joint center plane EM. More particularly, the first pairs of tracks—analogously to the pairs of tracks of UF joints—can be designed to be undercut-free when viewed from the joint aperture end.

According to a further embodiment, the pitch circle radius PCR$_1$ of the balls of the first pairs of tracks is smaller than the pitch circle radius PCR$_2$ of the balls of the second pairs of tracks.

A second solution provides a constant velocity joint in the form of a fixed joint with the following characteristics:

an outer joint part which comprises a longitudinal axis L12 and an attaching end and an aperture end arranged so as to be axially opposite one another, and which is provided with outer ball tracks, an inner joint part which comprises a longitudinal axis L13 and an attachment for a shaft pointing towards the aperture end of the outer joint part, and which is provided with inner ball tracks, the outer ball tracks and the inner ball tracks form pairs of tracks with one another, the pairs of track each accommodate a torque transmitting ball; and an annular ball cage is positioned between the outer joint part and the inner joint part and comprises circumferentially distributed cage windows which each accommodate at least one of the torque transmitting balls.

The centers of the balls are held by the cage in a joint center plane EM and, upon articulation of the joint, are guided onto the angle-bisecting plane between the longitudinal axes L12, L13.

The center lines M22, M23 of the ball tracks of pairs of tracks are positioned in pairs of track planes BE, BE* which extend parallel relative to one another and symmetrically relative to radial planes R1, R2 through the longitudinal axes L12, L13.

For a first part of the pairs of tracks, the opening angle α$_1$ between the tangents T22$_1$' T23$_1$' at track base lines extending parallel to the tangents T22$_1$, T23$_1$ at the center lines M22$_1$, M23$_1$ of the ball tracks in the joint center plane EM when the joint is in the aligned condition with coinciding longitudinal axes L12, L13 opens from the attaching end to the aperture end.

for a second part of the pairs of tracks, the opening angle α$_2$ between the tangents T22$_2$', T23$_2$' at track base lines extending parallel to the tangents T22$_2$, T23$_2$ at the centre lines M22$_2$, M23$_2$ of the ball tracks in the joint centre plane EM when the joint is in the aligned condition with coinciding longitudinal axes L12, L13 opens from the aperture end to the attaching end, and the following applies to the centre lines of the second pairs of tracks; in the outer joint part, the centre line M22$_2$ of the ball tracks in the region from the joint centre plane EM to the attaching end radially inwardly leaves a reference radius RB whose radius centre MBE is positioned in the point of intersection of a perpendicular line on the tangent T22$_2$ at the centre line M22$_2$ of the ball track in the joint centre plane EM and of a parallel axis PE, PE* relative to the longitudinal axis L12 through a track plane BE, BE*, in the inner joint part, the centre line M23$_2$ of the ball tracks in the region from the joint centre plane EM to the aperture end radially inwardly leaves a reference radius RB' whose radius centre MBE' is positioned in the point of intersection of a perpendicular line on the tangent T23$_2$' at the centre line M23$_2$ of the ball track in the joint centre plane EM and of a parallel axis PE, PE* relative to the longitudinal axis L13 through a track plane BE, BE*, in the outer joint part, the centre line M22$_2$ of the ball tracks in the region from the joint centre plane EM to the aperture end moves radially outwardly beyond said reference radius RB, and in the inner joint part, the centre line M23$_2$ of the ball tracks 23$_2$ in the region from the joint centre plane EM to the attaching end moves radially outwardly beyond said reference radius RB'.

The solution proposed here differs from the solution proposed first wherein the center lines of the pairs of tracks are positioned in radial planes through the center axes of the joint in that, in the present case, the center lines of pairs of tracks of two adjoining balls extend in two parallel track planes BE, BE* which extend parallel to and symmetrically to a radial plane R. As in the case of the first solution, the radial plane R is defined by the longitudinal axes L12, L13 when the joint is in the aligned condition. With the track shape, in principle, being the same as in the first solution, the track shapes of the second solution, however, refer to parallel axes PE, PE* which are positioned in a reference plane EX through the longitudinal axes L12, L13, which reference plane EX is positioned perpendicularly on the radial plane R. The track shapes of the second solution also refer to reference centers ME which are positioned on said parallel axes PE, PE* and in the point of intersection of the parallel axes with the joint center plane EM.

A third solution provides a constant velocity universal joint in the form of a fixed joint with the following characteristics:

an outer joint part which comprises a longitudinal axis L12 and an attaching end and an aperture end arranged so as to be axially opposite one another, and which is provided with outer ball tracks, an inner joint part which comprises a longitudinal axis L13 and an attachment for a shaft pointing towards the aperture end of the outer joint part, and which is provided with inner ball tracks, the outer ball tracks and the inner ball tracks form pairs of tracks with one another; and the pairs of tracks each accommodate a torque transmitting ball, an annular ball cage is positioned between the outer joint part and the inner joint part and comprises circumferentially distributed cage windows which each accommodate at least one of the torque transmitting balls.

The centers of the balls are held by the cage in a joint center plane and, upon articulation of the joint, are guided onto the angle-bisecting plane between the longitudinal axes $L12$, $L13$.

The center lines $M22_1$, $M23_1$ of adjoining ball tracks in the outer joint part are positioned in pairs of first track planes BE, BE* which extend parallel relative to one another and symmetrically relative to radial rays RS1, RS2 through the joint center M.

The center lines $M23_1$, $M23_2$ of adjoining ball tracks in the inner joint part are positioned in pairs of second track planes BE', BE*' which extend parallel relative to one another and symmetrically relative to radial rays RS1, RS2 through the joint center M.

The first track planes BE, BE* and the second track planes BE', BE*', together with radial planes RP1, RP2 through the longitudinal axes $L12$, $L13$, form identically sized angles y, y' which extend in opposite directions.

For a first part of the pairs of tracks, the opening angle $\alpha_2$ between the tangents $T22_1'$, $T23_1'$ at track base lines extending parallel to the tangents $T22_1'$, $T23_1'$ at the center lines $M22_1$, $M23_1$, of the ball tracks in the joint center plane EM when the joint is in the aligned condition with coinciding longitudinal axes $L12$, $L13$, opens from the attaching end to the aperture end.

For a second part of the pairs of tracks, the opening angle $\alpha_2$ between the tangents $T22_2'$, $T23_2'$ at track base lines extending parallel to the tangents $T22_2$, $T23_2$ at the center lines $M22_2$, $M23_2$ of the ball tracks in the joint center plane EM when the joint is in the aligned condition with coinciding longitudinal axes $L12$, $L13$ opens from the aperture end to the attaching end. The following applies to the center lines of the second pairs of tracks. In the outer joint part, the center line $M22_2$ of the ball tracks in the region from the joint center plane EM to the attaching end radially inwardly leaves a reference radius RB whose radius center MBE is positioned in the point of intersection of a perpendicular line on the tangent $T22_2$ at the centre line $M22_2$ of the ball track in the joint center plane EM and of a reference axis PE, PE* through a track plane BE, BE*. In the inner joint part, the center line $M23_2$ of the ball tracks in the region from the joint center plane EM to the aperture end radially inwardly leaves a reference radius RB' whose radius center MBE' is positioned in the point of intersection of a perpendicular line on the tangent $T23_2$ at the center line $M23_2$ of the ball tracks in the joint center plane EM and of a reference axis PE', PE*' through a track plane BE', BE*'.

In the outer joint part, the center line $M22_2$ of the ball tracks in the region from the joint center plane EM to the aperture end moves radially outwardly beyond said reference radius RB.

In the inner joint part, the center line $M23_2$ of the ball tracks in the region from the joint center plane EM to the attaching end moves radially outwardly beyond said reference radius RB'.

According to the third solution proposed here, the center lines of pairs of tracks of two adjoining balls in the outer joint part extend in two parallel planes BE, BE* which extend symmetrically to and parallel to a reference plane EB through the joint center, which reference plane EB, together with a radial plane R, forms an angle γ positioned in a second reference plane EX arranged perpendicularly on the radial plane, and in the inner part they extend in two parallel reference BE', BE*' which extend symmetrically to and parallel to a reference plane EB' through the joint center, which reference plane EB', together with a radial plane R, forms an angle γ' positioned in a second reference plane EX arranged perpendicularly on the radial plane. Said radial plane R, as in the case of the second solution, is defined by the longitudinal axes $L12$, $L13$ when the joint is in the aligned condition. With, in principle, the same track shape as in the second alternative, the track shapes according to the third solution, however, refer to parallel axes in the inner joint part and outer joint part, which axes are arranged so as to extend, in parallel, relative to one another in pairs, which intersect one another in pairs and which are positioned in a second reference plane EX through the longitudinal axes $L12$, $L13$ which is arranged perpendicularly on the radial plane R; they also refer to reference centers which are positioned on said parallel axes and in the point of intersection of the parallel axes with the joint center plane EM.

Joints according to the above-described second and third solutions comprise a number of track pairs which can be divided by two if only one track is positioned in each track plane BE, BE*, BE' BE*'. They comprise a number of track pairs which can be divided by four if each of the track planes BE, BE*, BE', BE*' contains two symmetrically shaped pairs of tracks arranged substantially opposite one another.

As explained above, the further embodiments of joints according to the second and third solutions—while the respective reference places are changed—substantially correspond to joint embodiments according to the first solution. This results in the following:

A first advantageous embodiment comprises the following further characteristics of the second pairs of tracks:

in the outer joint part, the local radius R1 of the centre line $M22_2$ in the joint center plane EM is smaller than the reference radius RB, and in the inner joint part, the local radius R1' of the center line $M23_2$ in the joint centre plane EM is smaller than the reference radius RB'.

A first advantageous embodiment comprises the following further characteristics of the second pairs of tracks:

in the outer joint part, the center line $M22_2$ of the ball tracks extends from the joint center plane EM to the attaching side radially outside a reference radius RZ whose radius center is positioned in the joint center plane EM on one of the reference axes PE, PE*, and in the inner joint part, the center line $M23_2$ of the ball tracks extends from the joint center plane EM to the aperture end radially outside a reference radius RZ' whose radius center is positioned in the joint center plane EM on one of the reference axes PE, PE*, PE', PE*'.

A further advantageous embodiment is characterised by the following further characteristics:

in the outer joint part, the center line $M22_2$ of the ball tracks extends from the joint center plane EM to the aperture end radially outside the reference radius RB and in the inner joint part, the center line $M23_2$ of the ball tracks extends from the joint center plane EM to the attaching end radially outside the reference radius RB'.

Furthermore, the following further characteristics are proposed for the second pairs of tracks:

in the outer joint part, the center line $M22_2$ of the ball tracks extends from the joint center plane EM to the aperture end radially inside a reference radius RZ whose radius center is positioned in the joint center plane EM on one of the parallel axes PE, PE*.

In the inner joint part, the center line $M23_2$ of the ball tracks extends from the joint center plane EM to the attaching end radially inside a reference radius RZ' whose radius center is positioned in the joint center plane EM on one of the parallel axes PE, PE*, PE', PE*'.

A further proposal concerns the following characteristics of the second pairs of tracks: the center lines $M22_2$, $M23_2$ of the outer ball tracks and inner ball tracks each comprise at least two arched portions which are curved in opposite senses and which adjoin one another in a turning point.

The turning points $W22_2$ of the outer ball tracks are positioned in a track plane BE, BE* at a distance from the center plane EM towards the aperture end.

The turning points $W23_2$ of the inner ball tracks are positioned in a track plane BE, BE*, BE', BE*' at a distance from the center plane EM towards the aperture end, the turning points $W22_2$, $W23_2$ are each positioned below a maximum of the distance between the center lines $M22_2$, $M23_2$ and the parallel axes PE, PE*, PE', PE*'.

A further embodiment comprises the following characteristics of the second pairs of tracks:

the track center lines $M22_2$ of the outer ball tracks comprise a first arch with the radius R1 whose center M1 in a track plane BE, BE* is offset by a first axial offset O1a from the center plane EM of the joint towards the attaching end and by a first radial offset O1r outwardly from a parallel axis PE, PE* and, in the region adjoining said arch, towards attaching end, they comprise a second arch with the radius R2 whose center M2 in the track plane BE, BE* is offset by a second axial offset O2a from the center plane EM of the joint towards the aperture end and is outwardly offset from the parallel axis PE, PE' by a second radial offset O2r which is greater than the sum of the first radius R1 and the first radial offset O1r.

The track center lines $M23_2$ of the outer ball tracks comprise a first arch with the radius R1' whose center M1' in a track plane BE, BE*, BE', BE*' is offset by a first axial offset O1a' from the center plane EM of the joint towards the aperture end and is offset outwardly by a first radial offset from a parallel axis PE, PE*, PE', PE*' and, in the region adjoining said arch, towards the aperture end, they comprise a second arch with the radius R2' whose center M2' in the track plane BE, BE*, BE', BE*' is offset by a second axial offset O2a' from the center plane EM of the joint towards the attaching end and is outwardly offset from the parallel axis PE, PE*, PE', PE*' by a second radial offset O2r' which is greater than the sum of the first radius R1' and the first radial offset O1r'.

A further proposal comprises the following characteristics of the second pairs of tracks: the radius of curvature of the center lines M22 of the outer ball tracks decreases in the extension from the center plane EM towards the attaching end and the radius of curvature of the center plane M23 of the inner ball tracks decreases in the extension from the center plane EM to the aperture end.

A further proposal comprises the following characteristics of the second pairs of tracks: the track center lines of the outer ball tracks $22_2$ comprise a third arch with the radius R3 which, tangentially, while having the same sense of curvature, adjoins the first arch with the radius R1 and whose radius R3 is smaller than the radius R1.

The track center lines $M23_2$ of the inner ball tracks comprise a third arch with the radius R3' which, tangentially, while having the same sense of curvature, adjoins the first arch with the radius R1' and whose radius R3' is smaller than the radius R1'.

Furthermore, in the second pairs of tracks, along the extension of the center line M22 of the outer ball tracks, towards the aperture end, the second arch is adjoined by an axis-parallel straight line G3 and that, along the extension of the center line M23 of the inner ball tracks, the second arch, towards the attaching end, is adjoined by an axis-parallel straight line G3'.

According to an alternative embodiment, in the second pairs of tracks along the extension of the center line $M22_2$ of the outer ball tracks, towards the aperture end, the second arch is adjoined by a straight line which approaches the parallel axis PE, PE' and that along the extension of the center line $M23_2$ of the inner ball tracks, the second arch, towards the attaching end, is adjoined by a straight line which approaches the parallel axis PE, PE*, PE', PE*'.

In this case, too, in the second pairs of tracks, the center lines M22, M23 of the ball tracks in the joint center plane EM intersect one another at an angle of 4 to 32°, wherein the tangents T22, T23 at the center lines M22, M23 of the ball tracks 22, 23 of all pairs of tracks form identical opening angles α when the joint is in the aligned condition.

A joint of the shape described here comprises a number of pairs of balls which can be divided by four. More particularly, the balls of two adjoining pairs of tracks positioned in parallel track planes BE, BE' are received in a common cage window of the ball cage.

As already explained above, the track planes BE, BE*, according to the second solution, can extend parallel to the longitudinal axes L12, L13 and the track planes BE, BE*, BE' BE*', according to the third solution, can extend at a helix angle y, y' relative to the longitudinal axes L12, L13.

According to a further embodiment, the pitch angle 2φ between the pairs of tracks whose balls are received in a common cage window is smaller than the pitch angle between adjoining pairs of tracks whose balls are received in different windows.

Between the helix angle y and the pitch angle 2φ there can exist the relation y=α/2 tans, with α/2 being the track inclination angle and half the opening angle respectively.

Furthermore, of two directly adjoining pairs of tracks, one constitutes a first pair of tracks and one a second pair of tracks. In addition, of two pairs of tracks positioned in one track plane, one constitutes a first pair of tracks and one a second pair of tracks, i.e. two substantially radially opposed tracks open towards the aperture end on the one hand and towards the attaching end on the other hand.

The invention will be explained in greater detail with reference to the drawings which show preferred embodiments of inventive joints as compared to a joint according to the state of the art.

BRIEF DESCRIPTION OF THE DRAWINGS

FIG. 3 shows an inventive joint according to FIG. 2 of the third solution:
a) in a cross-section; and
b) in a longitudinal section along sectional line A-A.

FIG. 4 shows geometric relations with reference to a pair of balls in a joint according to FIG. 3:
a) in a cross-section;
b) in a longitudinal section through a track plane; and
c) in a longitudinal section through a pair of balls.

a) for the outer joint part; and
b) for the inner joint part.

FIG. 6 shows the longitudinal axes and the track centre lines of the second tracks of an inventive joint in a second embodiment:

a) for the outer joint part; and
b) for the inner joint part.

DETAILED DESCRIPTION

Figure 1A:
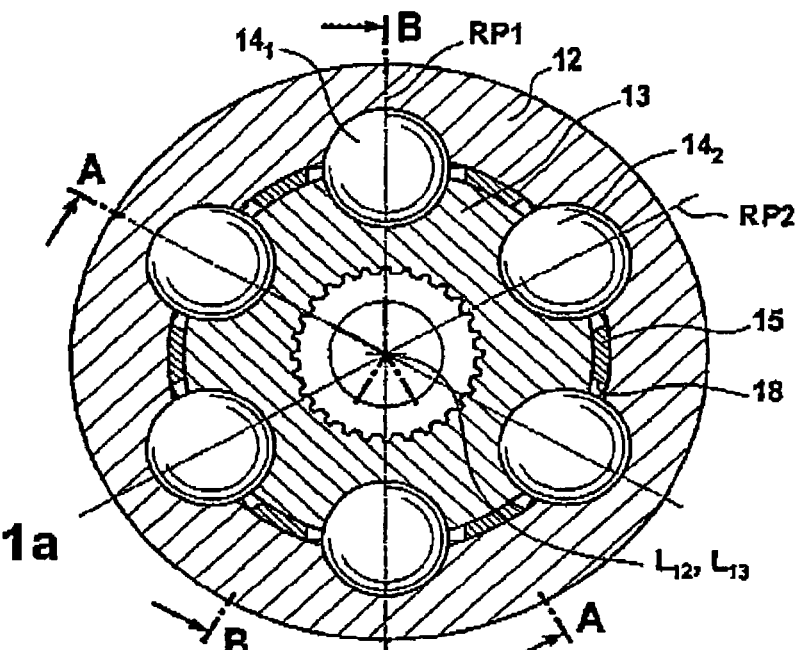
FIG. 1 shows an inventive joint according to the first solution:
a) in a cross-section;
b) in a longitudinal section along sectional line A-A; and
c) in a longitudinal section along sectional line B-B.
Figure 1B:
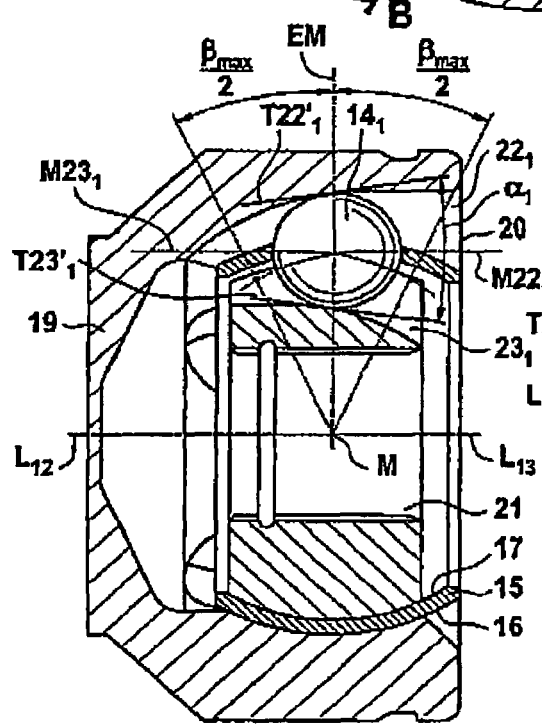
Figure 1C:
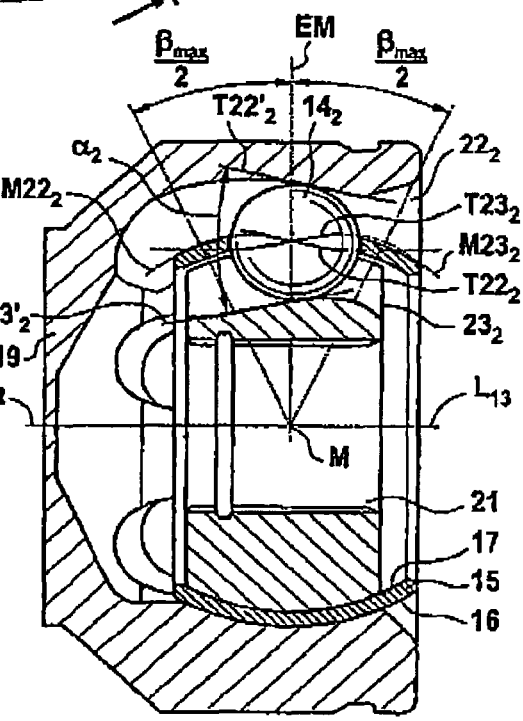

FIGS. 1*a* to 1*c* will be described jointly below. A joint 11 comprises an outer joint part 12, an inner joint part 13, torque transmitting balls 14 as well as a ball cage 15. The cage comprises a spherical outer face 16 which is guided in the outer joint part and a spherical inner cage face 17 which is guided on the inner joint part, with said second contact not being compulsory. The balls 14 are held in circumferentially distributed cage windows 18 in the ball cage 15 in a joint center plane EM. The outer joint part 12 is shown to comprise a longitudinal axis L12 and the inner joint part is shown to comprise a longitudinal axis L13. The point of intersection of the longitudinal axes L12, L13 with the joint center plane EM forms the joint center M. The outer joint part 12 comprises a base 19 which can change into an attaching journal for example, as well as an aperture 20 into which it is possible to insert a journal connectable to the inner joint part. For this purpose, the inner joint part 13 comprises an insertion aperture 21. Hereafter, the position of the base 19 indicates the axial direction "towards the attaching end" and the position of the aperture 20 indicates the axial direction "towards the aperture end". These terms are also used with reference to the inner joint part, with the actual attachment of a shaft to the inner joint part not being taken into account.

Starting from the center plane EM, the ball contact angles $\beta_{max}/2$ have been entered for the maximum articulation angle $\beta_{max}/2$ of the inner joint part 13 relative to the outer joint part 12 in both directions. First pairs of tracks 22$_1$, 23$_1$ with first balls 14$_1$ and second pairs of tracks 22$_2$, 23$_2$ with second balls 14$_2$ have been arranged so as to alternate around the circumference. The shape of the first pairs of tracks 22$_1$, 23$_1$ can be taken from section A-A and the shape of the second pairs of tracks 22$_2$, 23$_2$ from section B-B. The first balls 14$_1$ are in contact with first outer ball tracks 22$_1$ in the outer joint part and first inner ball tracks 23$_1$ in the inner joint part. The center lines M22$_1$, M23$_1$ of said tracks are of the type as used in UF tracks and are composed of a circular arch and a tangentially adjoining straight line. In the aligned position as illustrated, the tangents T22$_1$', T23$_1$' at the balls 14$_1$ in the contact points with the tracks 22$_1$, 23$_1$ form an opening angle α1 which opens towards the aperture end. The second balls 14$_2$ are guided in outer ball tracks 22$_2$ in the outer joint part and inner ball tracks 23$_2$, in the inner joint part. The balls 14$_2$ are shown to be in contact with the track base of the ball tracks, which contact does not necessarily have to be provided. In the aligned position as illustrated, the tangents T22$_2$', T23$_2$' at the balls 14$_2$ in the contact points with the tracks 22$_2$, 23$_2$ form an opening angle $\alpha_2$ which opens towards the attaching end. For describing the ball tracks 22, 23, reference is made below to the center lines M22$_2$, M23$_2$ of the ball tracks. The center plane EM is shown to comprise tangents T22$_2$, T23$_2$ to the center lines which tangents are positioned parallel to the above-mentioned tangents T22$_2$', T23$_2$'. The angle $\alpha_2$ between said tangents T22$_2$, T23$_2$ ranges between 4 and 32°.

It can be seen that each pair of tracks is positioned with its center lines M22, M23 in a radial plane RP1, RP2 through the joint, that said radial planes R are at identical angular distances from one another and that one ball 14 each is accommodated by a cage window 18 in the ball cage 15.

The pitch circle radius of the first balls 14$_1$ and the pitch circle radius of the second balls 14$_2$ can differ in size with their size ratio ranging from 0.8 to 1.0.

Figure 2A:
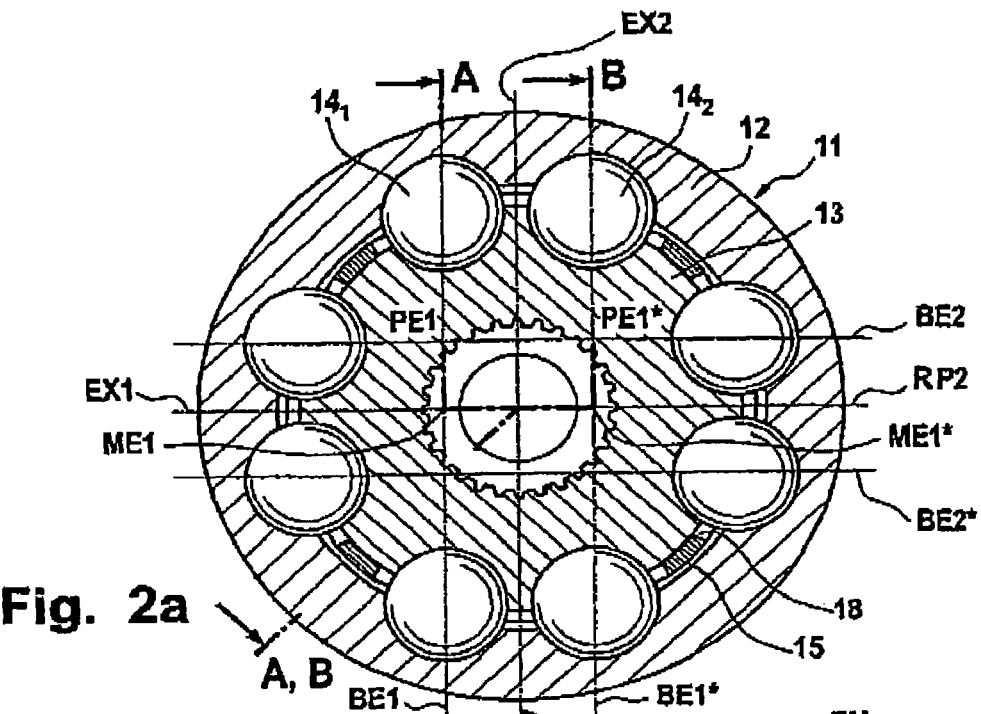
FIG. 2 shows an inventive joint according to the second solution:
a) in a cross-section;
b) in a longitudinal section along sectional line A-A; and
c) in a longitudinal section along sectional line B-B.
Figures 2B, 2C:
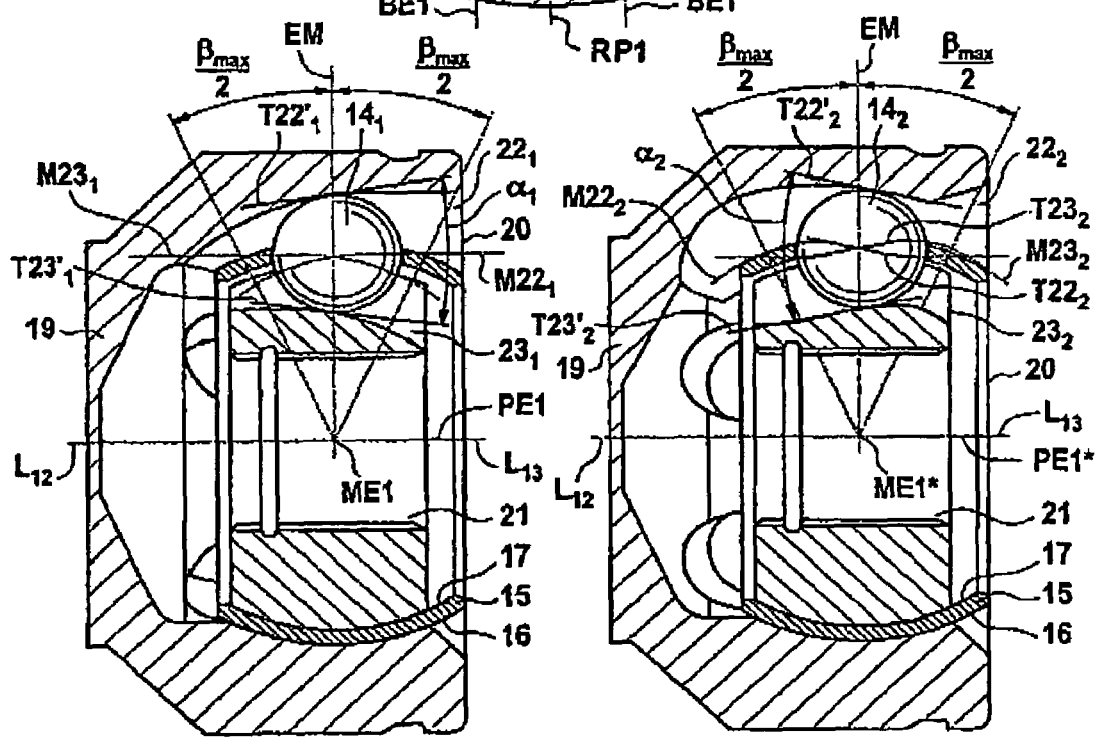

FIGS. 2*a* to 2*c* will be described jointly below. They show a joint 11 in an embodiment which has been modified as compared to the embodiment according to FIG. 1. Nevertheless, identical details have been given the same reference numbers as in FIGS. 1*a* to 1*c*. An inventive joint 11 in said second embodiment comprises ball tracks 22, 23 which are positioned in track planes BE, BE* which are arranged in pairs symmetrically relative to radial planes R through the joint. FIG. 2*b* shows an angled section according sectional line A-A, which angled section, on the one hand, extends through the track plane BE and a first pair of tracks 22$_1$, 23$_1$ with a first ball 14$_1$ and, on the other hand, through a radial plane between two pairs of tracks. FIG. 2*c* shows a bent section according to sectional line B-B, which bent section extends through a track plane BE* and a second pair of tracks with second ball tracks 22$_2$, 23$_2$ on the one hand and through a radial plane between two pairs of tracks on the other hand. It is possible to see pairs of track pairs which are distributed around the circumference and which comprise a first pair of tracks 22$_1$, 23$_1$ and a second pair of tracks 22$_2$, 23$_2$ and which are held in a common cage window 18. The pitch angle of said pairs of track pairs is smaller than that between two adjoining pairs of tracks which are not associated with a pair of track pairs. In the embodiment shows here, first pairs of tracks and second pairs of tracks alternate around the circumference.

As can be seen in FIG. 2*b*, the first balls 14$_1$ are guided in first pairs of tracks consisting of outer tracks 22$_1$ and inner tracks 23$_1$ which are of the type as contained in UF joints, which means that the center lines M22, M23 of said pairs of tracks are composed of radii and adjoining tangential straight lines. The tangents T22$_1$, T23$_1$' at the balls in the tracks form a first opening angle $\alpha_1$ which opens towards the aperture end of the outer joint part.

FIG. 2*c* shows a second ball 14$_2$ which is held in second outer ball tracks 22$_2$ and second inner ball tracks 23$_2$. Tangents T22$_2$, T23$_2$' at the balls 14$_2$ form an opening angle $\alpha_2$ with one another which opens towards the attaching end of the outer joint part. As far as the track extension is concerned, reference will be made below to the center lines M22$_2$, M23$_2$. In the joint center plane EM, the tangents T22$_2$, T23$_2$ at the center line M22$_2$, M23$_2$ intersect one another at the above-mentioned angle $\alpha_2$.

The track planes BE, BE* contain parallel axes PE, PE* extending relative to the longitudinal axes at the shortest distance, which thus form sectional lines between the track planes and a reference plane EX1, EX2 positioned perpendicularly relative to the respective radial plane RP1, RP2. On the parallel axes PE, PE*, there are positioned track centers ME, ME* at the shortest distance from the joint center M. If there are arranged four pairs of tracks symmetrically to three or four radial planes R with identical pitch angles relative to one another, there are obtained joints with twelve or sixteen pairs of tracks 22, 23 and, accordingly, with twelve or sixteen balls 14. In accordance with FIG. 2*a*, the center ME1, ME1* shown in FIGS. 2*b* and 2*c* is not the joint center, but the track curve center in one of the track planes BE1, BE1*.

FIGS. 3*a* and 3*b* will be described jointly below, where like details have been give like reference numbers accompanied by a "'". In principle, FIG. 3*a* corresponds to FIG. 2*a*, but in this case, the sectional line A-A extends parallel to a reference plane EX1 through the balls of a pair of track pairs. FIG. 3b shows a first reference plane EB for outer ball tracks, which is positioned perpendicularly on said reference plane EX1 and contains a radial ray RS through the joint centre M. Said reference plane EB', together with the radial plane R extending through the longitudinal axes L12, L13, forms a helix angle γ. Parallel to the reference plane EB, there are positioned the reference planes BE and BE* in which there extend the center lines of the outer ball tracks of a pair of tracks. Furthermore, FIG. 3b shows a first reference plane EB' for inner ball tracks which is also positioned perpendicularly on said reference plane EX and contains the radial ray RS through the joint center M. Said reference plane EB', together with the radial plane R through the longitudinal axes L12, L13 forms a helix angle γ' which is identical in size and extends in the opposite direction to y. The track planes BE', BE*' containing the center lines of the inner ball tracks of a pair of tracks extend parallel to the reference plane EB'. The center lines of each pair of tracks intersect one another in the joint center plane EM.

FIGS. 4a and 4c will be described jointly below, where like details have been give like reference numbers accompanied by a """. FIG. 4a shows a cross-section through a ball assembly which consists of four pairs of balls 141, 142 according to FIG. 3 and which is positioned in the joint centre plane. The pitch angle between the balls 141, 142 of a pair of balls and the radial plane RP 1 positioned therebetween amounts to φo and φo' respectively. The ball tracks are arranged at a distance from a reference plane EX1, which distance corresponds to the pitch circle radius PCR multiplied by the cosine of φo. The perpendicular distance of the balls of a pair of balls from said radial plane RP1 has been given the symbol a. The track planes BE1'BE1* as shown represent the passage of the track planes BE', BE*' of the inner ball tracks through the joint center plane.

In FIG. 4b, in the section through one of the track planes BE1' BE1*, the track opening angle between the tangents T22, T23 at the track center lines of a second pair of tracks has been given as $\alpha_2$, with the drawn-in angle legs representing the tangents T22', T23' at the track base lines of the track. $\alpha 2/2$ thus corresponds to half the opening angle and track inclination angle respectively.

FIG. 4c shows a pair of balls $14_1$, $14_2$ with the outer track planes EB, EB* and the inner track planes EB', EB*'. The penetration points D1, D2 as shown in FIG. 4b are also given.

The following equations apply to the ideal case wherein said track tangents T22, T23 penetrate the radial planes R in the axes L12, L13, i.e. the penetration points D1 and D2 are positioned on the longitudinal axes L12, L13.

The following relations apply:

$$\alpha = PCR \cdot \sin\varphi_0^1 \quad (1)$$

$$\frac{PCR \cdot \cos\varphi_0^1}{x} = \tan\frac{\alpha 2}{2} \text{ with } x = \frac{PCR\cos\varphi_0^1}{\tan\frac{\alpha 2}{2}} \quad (2)$$

$$\frac{a}{x} = \sin\mu \quad (3)$$

i.e. $\sin\mu = \dfrac{PCR \cdot \sin\varphi_0^1}{PCR \cdot \cos\varphi_0^1}$ for small angles $$\frac{\alpha 2}{2}$$

and γ the following approximation applies:

$$\sin \approx \text{arc}$$

$$\tan \approx \text{arc}$$

$$\text{arc}\mu \approx \tan\varphi_0^1 \cdot \text{arc}\frac{\alpha 2}{2} uldsomiL$$

$$\mu \approx \frac{\alpha 2}{2} \cdot \tan\varphi_0^1$$

Figure 5A:
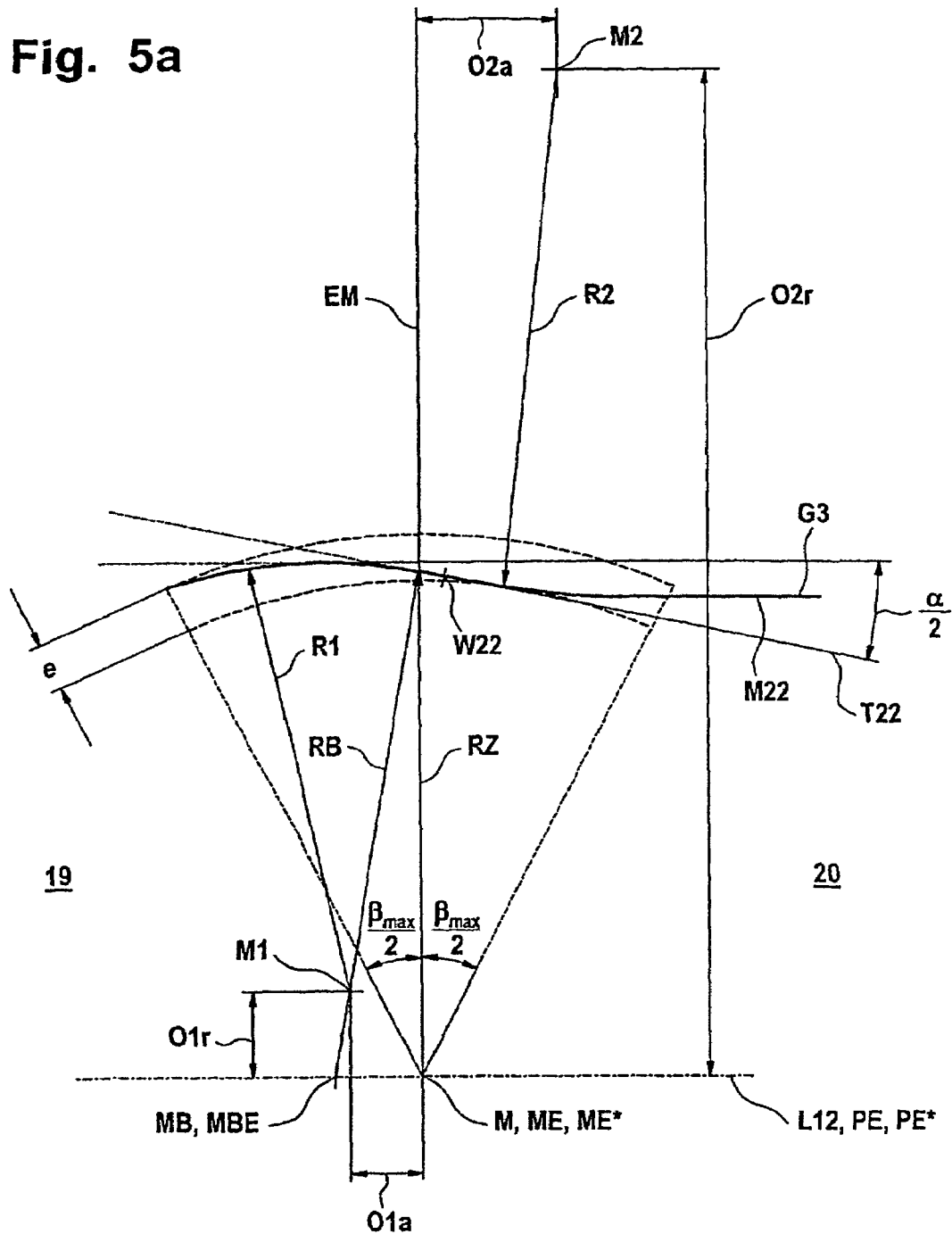
FIG. 5 shows the longitudinal axes and the track centre lines of the second tracks of an inventive joint in a first embodiment.

FIG. 5a shows the track center line M22 of an outer ball track 22 according to any one of FIGS. 1 to 3, which track center line M22 extends parallel to a track base line. The center line M22 of a track in the outer part is composed of a first arched portion with a first radius R1 around a center M1 with the first axial offset O1a and a radial offset O1r as well as of a second arched portion with a second radius R2 with a second axial offset O2a and a second radial offset O2r. Second radial offset O2r is greater than the sum of the first radius R1 and the first radial offset O1r. The transition is indicated by a turning point W22. The second radius R2 is tangentially adjoined by a straight line G3 extending parallel to the axis L12, PE, PE*. The center plane EM is shown to comprise the tangent T22 and the center line M22 which intersects a longitudinal axis L12, PE, PE* at an angle α/2. A perpendicular line on the tangent T22 intersects the longitudinal axis L12, PE; PE* in the reference center MB, MBE of a reference radius RB. First radius R1 is smaller than reference radius RB. A further reference radius RZ is entered around the track center M, ME. To the left of the center plane EM, towards the attaching end 19, the center line M22 extends inside the radius RB and outside the radius RZ. To the right of the center plane EM, towards the aperture end 20, the center line M22 extends substantially outside the radius RB. The radial ball movement of a ball on its path along the ball track with reference to the track center M, ME has been given the reference symbol e. This corresponds to the minimum thickness of the ball cage in the region of the cage window, with a safety allowance being required to avoid edge bearing.

Figure 5B:
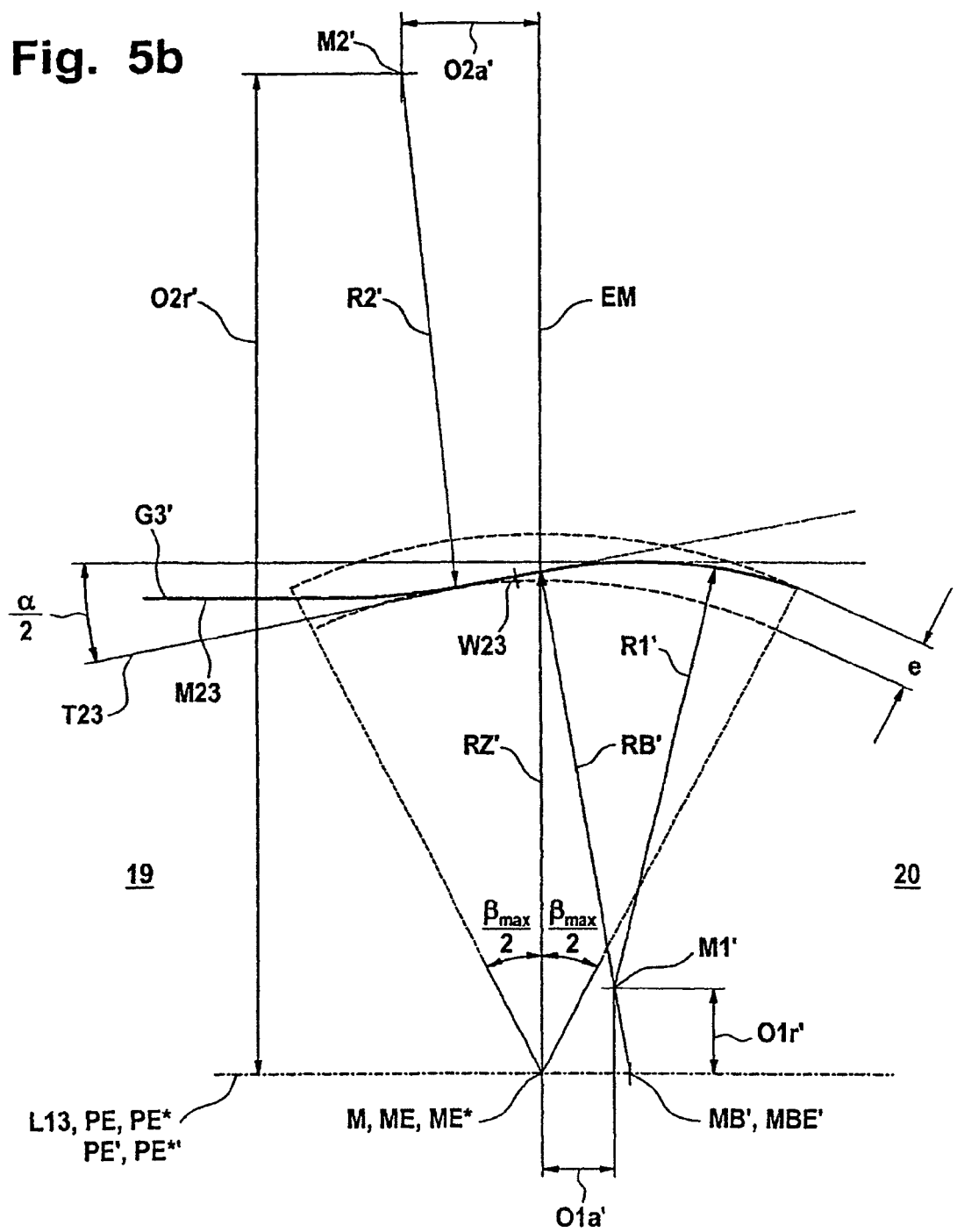

FIG. 5b shows the track center lines M23 of the associated inner ball tracks 23 according to any one of FIGS. 1 to 3, which track center lines M23 extend parallel relative to the track base lines. The center line M23 of a track in the inner part 13 is composed of a first arched portion with a first radius R1' around a center M1' and of a second arched portion with a second radius R2' around a centre M2'. The transition is indicated by a turning point W23. The second radius R2' is adjoined by a straight line G3' which extends parallel relative to the axis L13, PE, PE*, PE', PE*'. The center M1' comprises an axial offset O1a' and a radial offset O1r' and the center M2' comprises an axial offset O2a' and a radial offset O2r'. Second radial offset O2r' is greater than the sum of the first radius R1' and the first radial offset O1r'. In the center plane EM, there is shown the tangent T23 at the center line M23, which intersects a longitudinal axis L13, PE, PE*, PE', PE*' at the angle α/2. A perpendicular line at the tangent T23 intersects the longitudinal axis L13, PE; PE*, PE', PE*' in the reference center MB', MBE' of a reference radius RB'. Second radius R1' is smaller than reference radius RB'. A further reference radius RZ' has been entered around the track center M, ME. To the right of the center plane EM, towards the aperture end 20, the center line M23 extends inside the radius RB' and outside the radius RZ'. To the left of the center plane EM, towards the attaching end 19, the center line M23 extends at least predominately outside the radius RB'. The radial ball movement of a ball on its path along the ball track with reference to the track center M, ME has been given the reference symbol e. The two center lines M22, M23 of FIGS. 5a, 5b intersect one another in the joint center plane EM at the angle α and extend mirror-symmetrically relative to said centre plane.

According to an alternative embodiment, in the second pairs of tracks, along the extension of the center line M22$_2$ of the outer ball tracks, towards the aperture end, the second arch is adjoined by a straight line which approaches the longitudinal axis L12 and that, along the extension of the center line M23$_2$ of the inner ball tracks, towards the attaching end, the second arch is adjoined by a straight line which approaches the longitudinal axis L13.

Figure 6A:
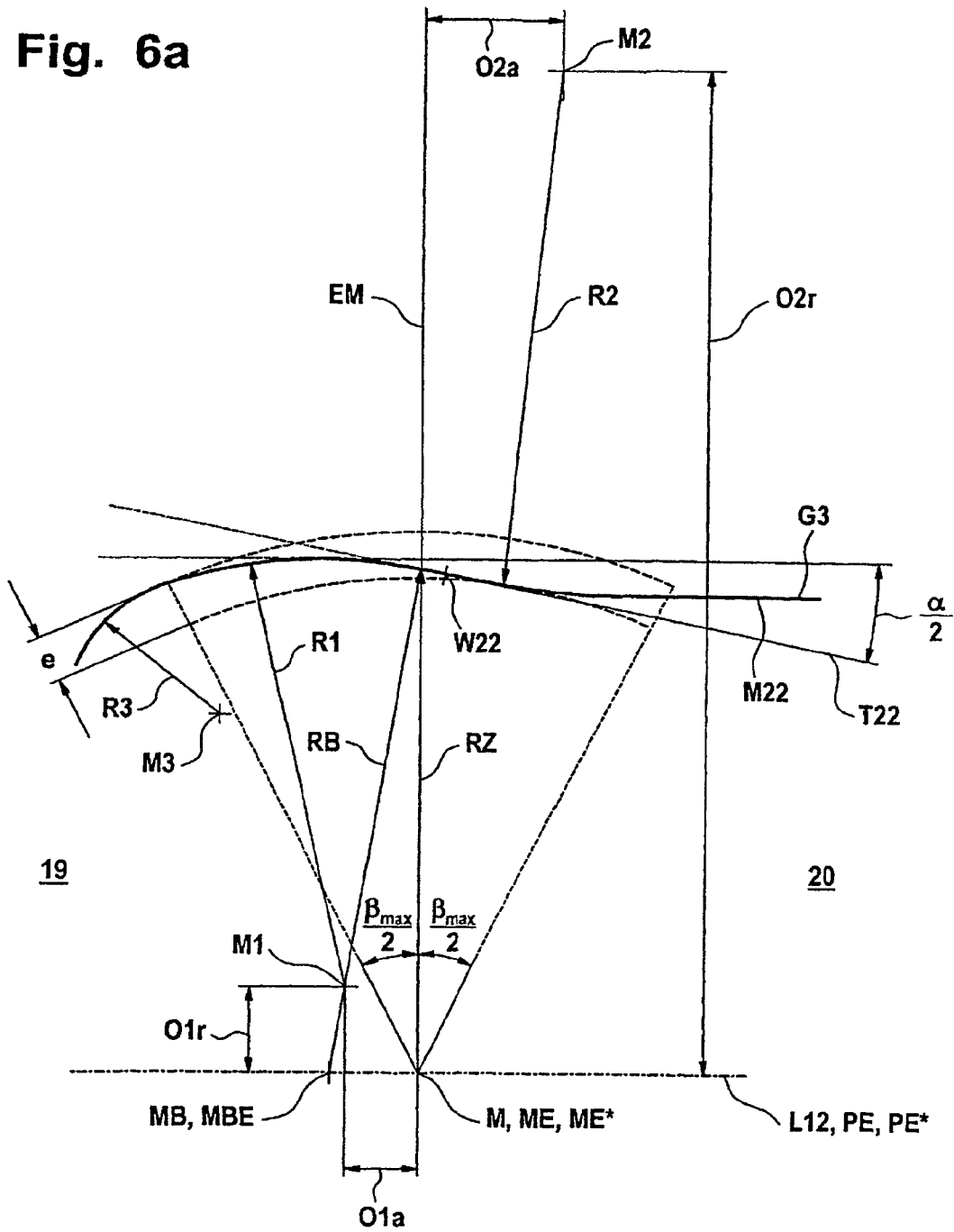

FIG. 6a, in a modified embodiment, shows the track center line M22 of an outer ball track 22, which track center line M22 extends parallel to a track base line. The center line M22 of a track in the outer joint part is composed of a first radius R1 around a center M1 with a first axial offset O1a and a radial offset O1r as well as of a second radius R2 with a second axial offset O2a and a second radial offset O2r as well as of a third radius R3 which adjoins the radius R1 opposite to the radius R2, which is smaller than the radius R1 and is curved in the same direction, with the position of its center M3 not being given detailed dimensions. The transition between the first and second radius is indicated by the turning point W22. The second radius R2 is tangentially adjoined by a straight line G3 which extends parallel to the axis L12, PE, PE*. In the center plane EM, there are shown the tangent T22 and the center line M22 which intersects a longitudinal axis L12, PE, PE* at the angle α/2. A perpendicular line on the tangent T22 intersects the longitudinal axis L12, PE; PE* in the reference center MB, MBE of a reference radius RB. A further reference radius has been entered around the track center M, ME. To the left of the center plane, towards the attaching end 19, the center line M22 extends inside the radius RB and outside the radius RZ. To the right of the center plane EM, towards the aperture end 20, the center line M22 extends predominately outside the radius RB. The radial ball movement of a ball on its path along the ball track with reference to the track center M, ME has been given the reference symbol e. This corresponds to the minimum thickness of the ball cage in the region of the cage windows, with a safety allowance having to be provided to avoid edge bearing.

Figure 6B:
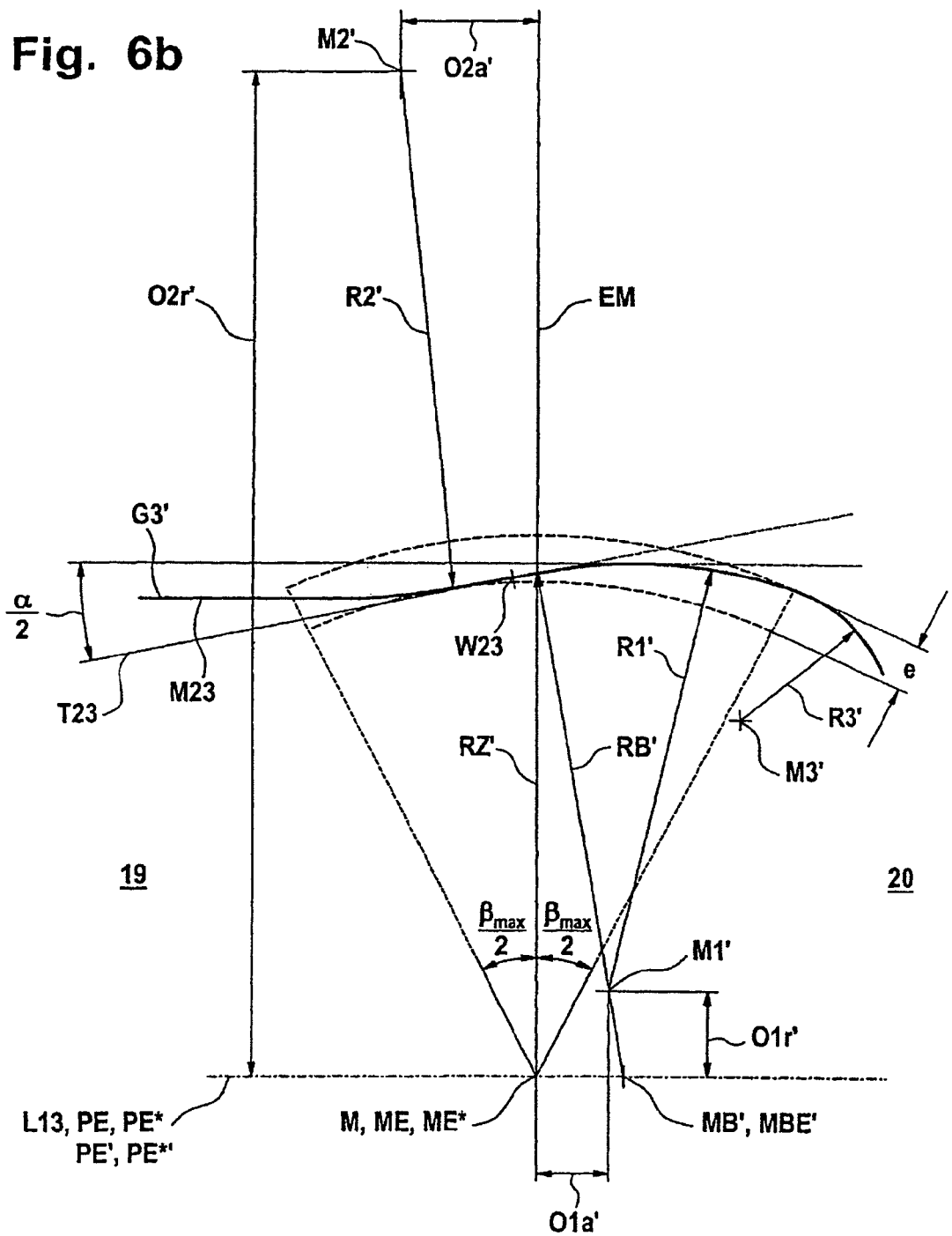

FIG. 6b, in a modified embodiment, shows the track center line M23 of an inner ball track 23, which track center line M23 extends parallel to a track base line. The center line M23 of a track 23 in the inner joint part 13 is composed of a first radius R1 around a center M1', of a second radius R2' around a center M2' as well as of a third radius R3' which adjoins the radius R1' opposite to the radius R2', which is smaller than said radius R1 and is curved in the same direction. The second radius R2' is adjoined by a straight line G3 which extends parallel to the axis L13, PE, PE*, PE'. PE*'. The center M2' comprises an axial offset O1a' and a radial offset O1r' and the center M2' comprises an axial offset O2a' and a radial offset O2r'. The position of the center M3' has not been given detailed dimensions. In the center plane EM, there are shown the tangent T23 and the center line M23 which intersects a longitudinal axis L13, PE, PE*, PE', PE*' at the angle α/2. A perpendicular line on the tangent T23 intersects the longitudinal axis L12, PE; PE*, PE', PE*' in the reference center MB', MBE' of a reference radius RB'. A further reference radius RZ' has been entered around the track center M, ME. To the right of the center plane EM, towards the aperture end 20, the center line M23 extends inside the radius RB' and outside the radius RZ'. To the left of the center plane EM, towards the attaching end 19, the center line M23 extends predominately outside the radius RB'. The radial ball movement of a ball on its path along the ball track with reference to the track center M, ME has been given the reference symbol e. The two center lines M22, M23 of FIGS. 6a, 6b intersect one another in the joint center plane EM at the angle α and extend mirror-symmetrically relative to said center plane.

Counter Track Joint for Large Articulation Angles

| List of reference numbers | |
|---|---|
| 11 | joint |
| 12 | outer joint part |
| 13 | inner joint part |
| 14 | ball |
| 15 | cage |
| 16 | outer cage face |
| 17 | inner cage face |
| 18 | cage window |
| 19 | base |
| 20 | aperture |
| 21 | insertion aperture |
| 22 | outer ball track |
| 23 | inner ball track |
| 24 | track base of outer ball track |
| 25 | track base of inner ball track |
| 26 | track flank |
| 27 | track flank |
| EM | joint centre plane |
| L12 | longitudinal axis of outer part |
| L13 | longitudinal axis of inner part |
| M22 | centre line of track 22 |
| M23 | centre line of track 23 |

The invention claimed is:
1. A constant velocity fixed joint comprising:
an outer joint part which comprises a first longitudinal axis and an attaching end and an aperture end arranged so as to be axially opposite one another, and outer ball tracks;
an inner joint part which comprises a second longitudinal axis and an attachment for a shaft pointing towards the aperture end of the outer joint part, and inner ball tracks,
the outer ball tracks and the inner ball tracks form pairs of tracks with one another which each accommodate a torque transmitting ball;
an annular ball cage between the outer joint part and the inner joint part and comprising circumferentially distributed cage windows which each accommodate at least one of the torque transmitting balls, the centers of the balls are held by the cage in a joint center plane and, upon articulation of the joint, are guided onto an angle-bisecting plane between the first and second longitudinal axes,
wherein center lines of the outer and inner ball tracks, of pairs of tracks are positioned in pairs of track planes which extend substantially parallel relative to one another and symmetrically relative to radial planes through the first and second longitudinal axes,
for first pairs of tracks, a first opening angle ($α_1$) between tangents at track base lines extending parallel to tangents at the center lines of the ball tracks in the joint center plane when the joint is aligned with coinciding longitudinal axes opens from the attaching end to the aperture end, for second pairs of tracks, second opening angle ($\alpha_2$) between tangents at track base lines extending parallel to tangents at the center lines of the ball tracks in the joint center plane when the joint is aligned with coinciding longitudinal axes opens from the aperture end to the attaching end, and for the center lines of the second pairs of tracks:

in the outer joint part, the center line of the ball tracks of the second pairs of tracks in a region from the joint center plane to the attaching end radially inwardly departs a first reference radius centered in a point of intersection of a perpendicular line on a tangent at the center line of the ball track in the joint center plane and of a parallel axis relative to the first longitudinal axis through a track plane;

in the inner joint part, the center line of the ball tracks of the second pairs of tracks in a region from the joint center plane to the aperture end radially inwardly departs a second reference radius centered in a point of intersection of a perpendicular line on a tangent at the center line of the ball track in the joint center plane and of a parallel axis relative to the second longitudinal axis through a track plane;

in the outer joint part, the center line of the ball tracks of the second pairs of tracks in the region from the joint center plane to the aperture end moves radially outwardly beyond said first reference radius; and in the inner joint part, the center line of the ball tracks of the second pairs of tracks in the region from the joint center plane to the attaching end moves radially outwardly beyond said second reference radius.

2. A constant velocity joint according to claim 1 wherein for the second pairs of tracks:

in the outer joint part, a first outer ball track local radius (R1) of curvature of the center line in the joint center plane is smaller than the first reference radius, and in the inner joint part, a first inner ball track radius (R1') of curvature of the center line in the joint center plane is smaller than the second reference radius.

3. A constant velocity joint according to claim 1 wherein for the second pairs of tracks:

in the outer joint part, the center line of the ball tracks extends from the joint center plane to the attaching end radially outside a third reference radius (RZ) whose radius center is positioned in the joint center plane (EM) on one of the parallel axes, and in the inner joint part, the center line of the ball tracks extends from the joint center plane to the aperture end radially outside a fourth reference radius (RZ') whose radius center is positioned in the joint center plane on one of the parallel axes.

4. A joint according to claim 1 wherein for the second pairs of tracks:

in the outer joint part, the center line of the ball tracks extends from the joint center plane to the aperture end radially outside the first reference radius, and in the inner joint part, the center line of the ball tracks extends from the joint center plane to the attaching end radially outside the second reference radius.

5. A constant velocity joint according to claim 1 wherein for the second pairs of tracks:

in the outer joint part, the center line of the ball tracks extends from the joint center plane to the aperture end radially inside a third reference radius (RZ) whose radius center (ME) is positioned in the joint center plane (EM) on one of the parallel axes, and in the inner joint part, the center line of the ball tracks extends from the joint center plane to the attaching end radially inside a fourth reference radius (RZ') whose radius center is positioned in the joint center plane on one of the parallel axes.

6. A constant velocity joint according to claim 1 wherein for the second pairs of tracks:

the center lines of the outer ball tracks and inner ball tracks each comprise at least two arched portions which are curved in opposite senses and which adjoin one another in a turning point, the turning points of the outer ball tracks are positioned in a track plane at a distance from the center plane towards the aperture end, and wherein the turning points of the inner ball tracks are positioned in a track plane at a distance from the center plane towards the aperture end, the turning points are each positioned below a maximum of the distance between the center lines and the parallel axes.

7. A constant velocity joint according to claim 1 wherein for the second pairs of tracks:

the track center lines of the outer ball tracks comprise a first arch with a radius (R1) whose center in the track plane is offset by a first axial offset (O1a) from the center plane (EM) of the joint towards the attaching end and by a first radial offset (O1r) from the parallel axis towards the ball track and, in the region adjoining said arch, towards the attaching end, they comprise a second arch with the radius (R2) whose center in the track plane is offset by a second axial offset (O2a) from the center plane of the joint towards the aperture end and is outwardly offset from the parallel axis by a second radial offset (O2r) which is greater than the sum of the first arch radius (R1) and the first radial offset (O1r), and the track center lines of the inner ball tracks comprise a first arch with a radius (R1') whose center in a track plane is offset by a first axial offset (O1a') from the center plane of the joint towards the aperture end and by a first radial offset (O1r') from the parallel axis towards the ball track and, in the region adjoining said arch, towards the aperture end, they comprise a second arch with a radius (R2') whose center in the track plane is offset by a second axial offset (O2a') from the center plane of the joint towards the attaching end and is outwardly offset from the parallel axis by a second radial offset (O2r') which is greater than the sum of the first arch radius (R1') and the first radial offset (O1r').

8. A constant velocity joint according to claim 7 wherein for the second pairs of tracks:

a radius of curvature of the center lines of the outer ball tracks decreases in its extension from the center plane towards the attaching end and the radius of curvature of the center line of the inner ball tracks decreases in its extension from the center plane to the aperture end.

9. A constant velocity joint according to claim 8 wherein for the second pairs of tracks:

the track center lines of the outer ball tracks comprise a third arch with a radius (R3) which tangentially, while having the same sense of curvature, adjoins the first arch and whose radius (R3) is smaller than the first arch radius (R1), and the track center lines of the inner ball tracks comprise a third arch with a radius (R3') which tangentially, while having the same sense of curvature, adjoins the first arch and whose radius (R3') is smaller than the first arch radius (R1').

10. A joint according to claim 7 wherein, in the second pairs of tracks, along the extension of the center line of the outer ball tracks, towards the aperture end, the second arch (R2) is adjoined by an axis-parallel straight line (G3) and wherein, along the extension of the center line of the inner ball tracks, the second arch (R2'), towards the attaching end, is adjoined by an axis-parallel straight line (G3').

11. A joint according to claim 7 wherein, in the second pairs of tracks, along the extension of the center line of the outer ball tracks, towards the aperture end, the second arch (R2) is adjoined by a straight line which approaches the parallel axis, and wherein along the extension of the center line of the inner ball tracks, the second arch (R2'), towards the attaching end, is adjoined by a straight line which approaches the parallel axis.

12. A constant velocity joint according to claim 1 wherein for the second pairs of tracks:
a radius of curvature of the center lines of the outer ball tracks decreases in its extension from the center plane towards the attaching end and the radius of curvature of the center line of the inner ball tracks decreases in its extension from the center plane to the aperture end.

13. A joint according to claim 1 wherein, in the second pairs of tracks, the center lines of the ball tracks in the joint center plane intersect one another at an angle of 4 to 32°, and wherein tangents at the center lines of the ball tracks of all pairs of tracks form identical opening angles ($\alpha$) when the joint is aligned.

* * * * *

UNITED STATES PATENT AND TRADEMARK OFFICE
CERTIFICATE OF CORRECTION

| | |
|---|---|
| PATENT NO. | : 7,632,189 B2 |
| APPLICATION NO. | : 10/568896 |
| DATED | : December 15, 2009 |
| INVENTOR(S) | : Peter Schwarzler et al. |

Page 1 of 1

It is certified that error appears in the above-identified patent and that said Letters Patent is hereby corrected as shown below:

Claim 2, Column 17, line 37, change "first outer ball track local radius" to --first outer ball track radius--

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,632,189 B2 | Page 1 of 1 |
| APPLICATION NO. | : 10/568896 | |
| DATED | : December 15, 2009 | |
| INVENTOR(S) | : Peter Schwarzler et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 698 days.

Signed and Sealed this

Twenty-eighth Day of September, 2010

David J. Kappos
*Director of the United States Patent and Trademark Office*